United States Patent
Govindarajan et al.

(10) Patent No.: US 10,243,877 B1
(45) Date of Patent: Mar. 26, 2019

(54) NETWORK TRAFFIC EVENT BASED PROCESS PRIORITY MANAGEMENT

(71) Applicant: Juniper Networks, Inc., Sunnyvale, CA (US)

(72) Inventors: Ramanan Govindarajan, Saratoga, CA (US); Sreekanth Rupavatharam, Campbell, CA (US); Erin C. Macneil, Carp (CA)

(73) Assignee: Juniper Networks, Inc., Sunnyvale, CA (US)

( * ) Notice: Subject to any disclaimer, the term of this patent is extended or adjusted under 35 U.S.C. 154(b) by 178 days.

(21) Appl. No.: 15/364,944

(22) Filed: Nov. 30, 2016

(51) Int. Cl.
*G06F 9/48* (2006.01)
*H04L 29/08* (2006.01)
*H04L 12/927* (2013.01)

(52) U.S. Cl.
CPC .......... *H04L 47/805* (2013.01); *G06F 9/4881* (2013.01); *H04L 67/327* (2013.01)

(58) Field of Classification Search
CPC .... H04W 72/085; H04W 40/12; H04L 5/0023
USPC .................. 370/286–409; 709/206
See application file for complete search history.

(56) References Cited

U.S. PATENT DOCUMENTS

| | | | | |
|---|---|---|---|---|
| 2005/0066005 | A1* | 3/2005 | Paul | G06Q 10/107 709/206 |
| 2013/0110794 | A1* | 5/2013 | Lee | G06F 17/30303 707/692 |
| 2016/0044692 | A1* | 2/2016 | Egner | H04W 72/085 370/330 |

* cited by examiner

*Primary Examiner* — Iqbal Zaidi
(74) *Attorney, Agent, or Firm* — Harrity & Harrity, LLP

(57) ABSTRACT

A device may receive a packet associated with an application. The device may identify a filter associated with the application. The device may determine that information associated with the packet matches information associated with the filter. The device may compare a count, associated with the filter, and an expediting threshold associated with expediting processing of the packet based on determining that the information associated with the packet matches the information associated with the filter. The device may selectively expedite processing of the packet based on comparing the count and the expediting threshold.

20 Claims, 7 Drawing Sheets

NETWORK TRAFFIC EVENT BASED PROCESS PRIORITY MANAGEMENT

BACKGROUND

In computing systems, work, such as processes, threads, or the like, may be scheduled by assigning resources to perform the work in accordance with rules, priorities, a scheduling algorithm, or the like. The scheduling of work is typically carried out by a scheduler, which may facilitate one or more objectives, such as maximizing throughput, minimizing response time, minimizing latency, maximizing fairness among processes, or the like.

SUMMARY

According to some possible implementations, a device may include one or more processors to: receive a packet associated with an application; identify a filter associated with the application; determine that information associated with the packet matches information associated with the filter; compare a count, associated with the filter, and an expediting threshold, associated with expediting processing of the packet, based on determining that the information associated with the packet matches the information associated with the filter; and selectively expedite processing of the packet based on comparing the count and the expediting threshold.

According to some possible implementations, a non-transitory computer-readable medium may store instructions that, when executed by one or more processors, cause the one or more processors to: receive a packet associated with an application; determine whether information associated with the packet matches information associated with a filter, where the filter may be associated with the application, where a count may be associated with the filter and may be associated with expediting processing of packets associated with the application; and selectively expedite processing of the packet based on determining whether the information associated with the packet matches the information associated with the filter and based on the count associated with the filter.

According to some possible implementations, a method may include: registering, by a device, a filter associated with expediting processing of packets associated with an application; receiving, by a device, a packet associated with the application; determining, by the device and based on receiving the packet, that information associated with the packet matches information associated with the filter; determining, by the device and based on determining that the information associated with the packet matches the information associated with the filter, whether a count, associated with the filter, satisfies a threshold; and selectively expediting, by the device, processing of the packet based on whether the count satisfies the threshold.

DETAILED DESCRIPTION

Figure 1A:
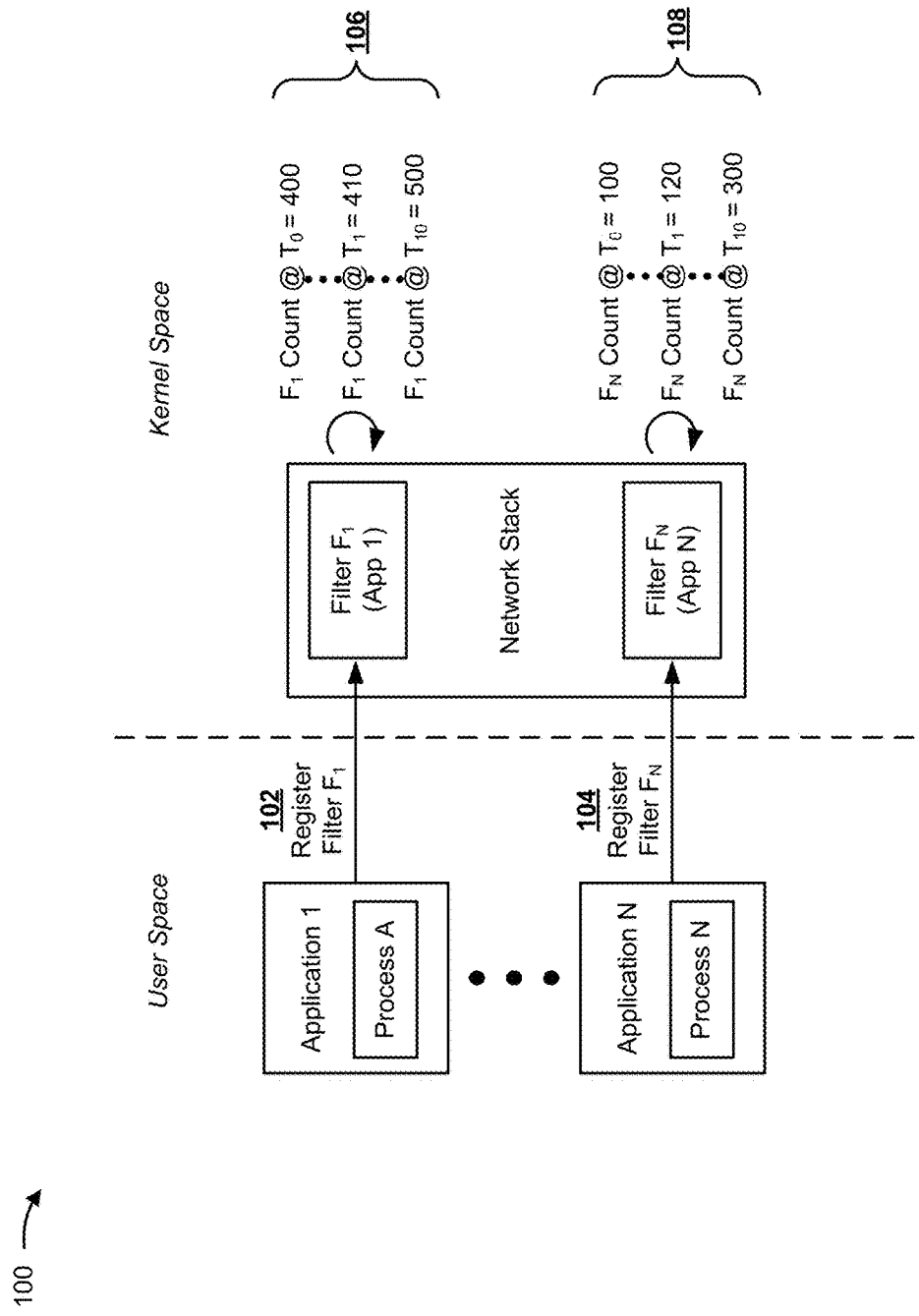
FIGS. 1A-1C are diagrams of an overview of an example implementation described herein.

The following detailed description of example implementations refers to the accompanying drawings. The same reference numbers in different drawings may identify the same or similar elements.

A network device (e.g., a router, a switch, a gateway, a firewall, or the like) may host a number of applications associated with providing one or more network services, such as a firewall service, a security service, a packet forwarding service, a packet processing service, or the like. Here, upon receiving a packet associated with an application, the network device may schedule the packet for processing (e.g., by queuing a process, associated with processing the packet, for execution).

In some cases, an application may have a timing requirement, associated with processing packets for the application, that should be satisfied in order to provide the network service. For example, a request, associated with an application (e.g., sent via a particular port, sent by a particular device, or the like) may need to be processed such that a timing requirement, associated with responding to the request, can be satisfied (e.g., in order to avoid a time-out, in order to satisfy a latency requirement, or the like).

Since the network device may host multiple applications, associated with multiple services, the network device may schedule processing of packets, associated with the multiple applications, using a scheduling algorithm. However, the scheduling algorithm may not take into account a need to satisfy such a timing requirement when scheduling a packet for processing by the network device. Thus, satisfaction of the timing requirement may not be guaranteed.

In some cases, the network device may be configured to assign a higher priority level for processing of packets associated with a time-sensitive application (e.g., relative to a priority level for packets associated with an application that is not as time-sensitive). However, the relatively higher priority level may not ensure that the packet is timely processed (e.g., since other packets with the same or even higher priority levels may be similarly scheduled).

Implementations described herein may provide a network device capable of ensuring expedited processing of a packet such that the packet is processed in accordance with a timing requirement. In some implementations, the network device may utilize a filter, associated with the application, to determine that processing of the packet should be expedited. Here, upon receiving a packet that matches the filter, the network device may execute a process (e.g., a process, a thread, or the like), associated with processing the packet, in order to ensure that the packet is processed in accordance with the timing requirement.

In some implementations, the network device may distribute, manage, and monitor a count, associated with the filter, in order to ensure fairness of expedited processing (i.e., in order to ensure that the application does not over-utilize expedited packet processing to the detriment of other applications), as described below. In this way, the network device may ensure that a packet, associated with an application, is processed in accordance with a timing requirement, while also ensuring fairness of expedited processing amongst multiple applications.

Figure 1B:
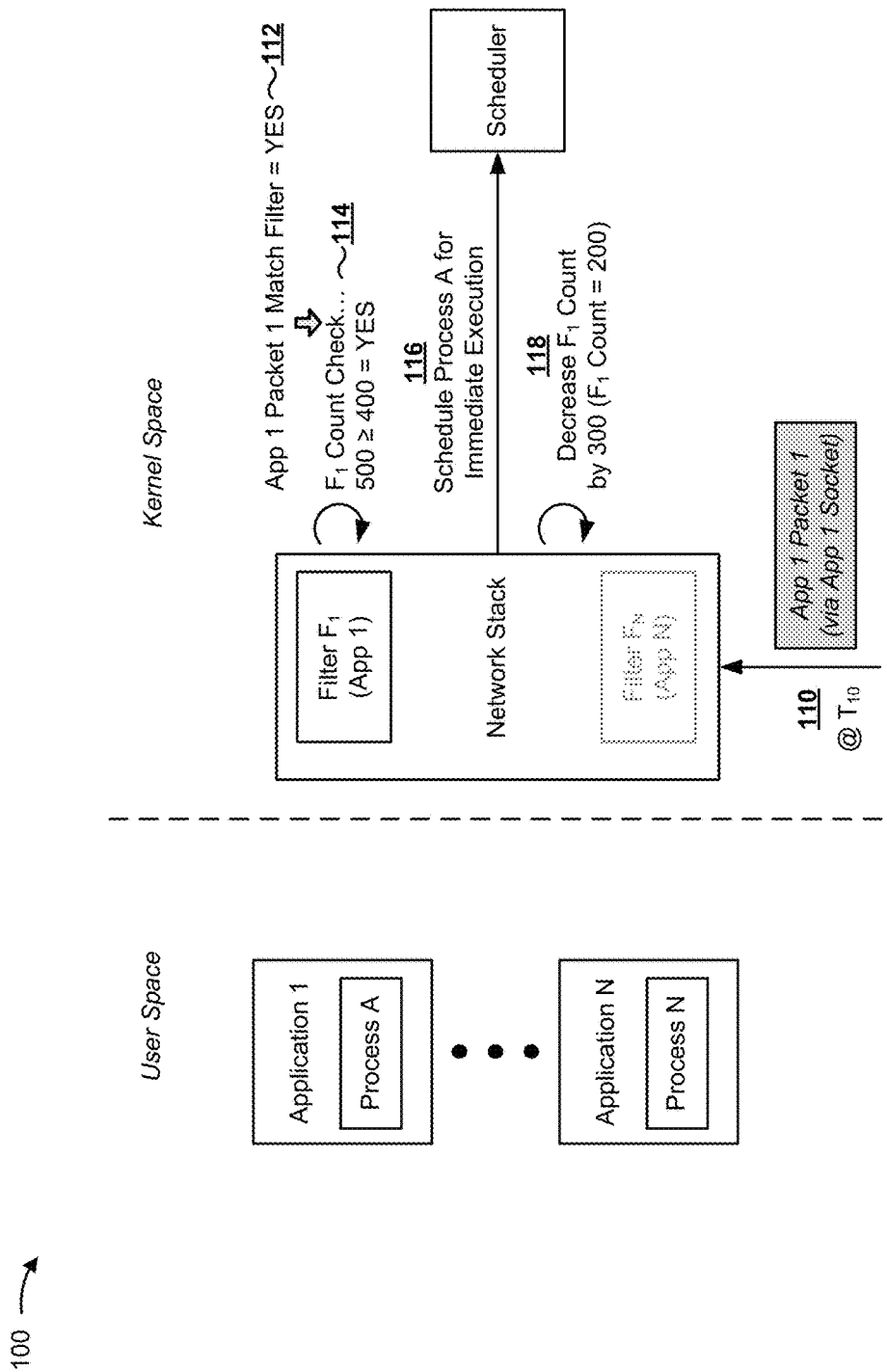
Figure 1C:
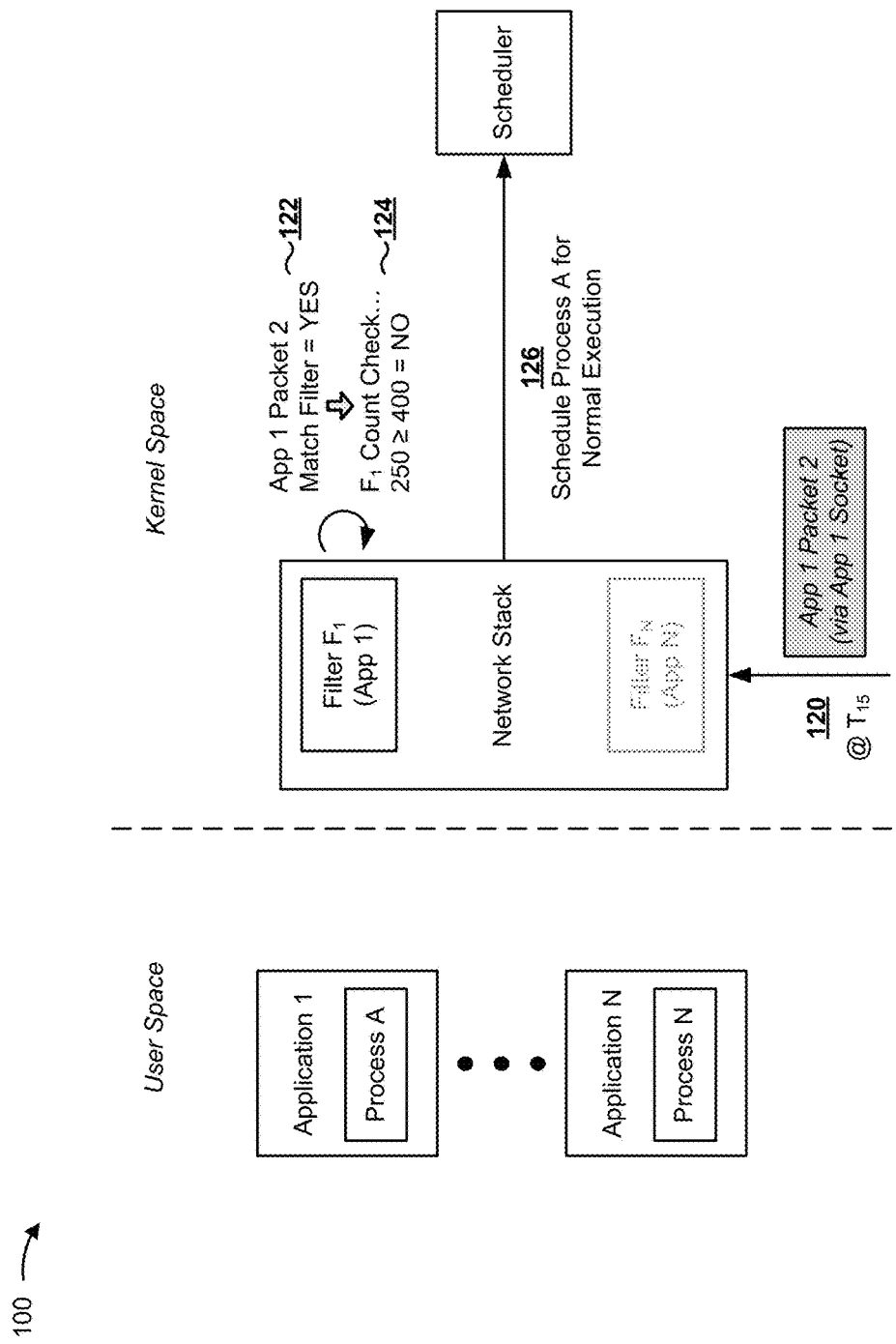

FIGS. 1A-1C are diagrams of an overview of an example implementation 100 described herein. As shown in FIGS. 1A-1C, multiple applications may be hosted by a network device that may be associated with providing one or more network services. As shown, each application may be associated with one or more processes to be executed by the network device in order to provide the one or more network services.

As shown in FIG. 1A, example implementation 100 may include applications 1 to N, and may further include a network stack that within which filters, associated with applications 1 to N, may be registered. A filter may include information, associated with an application, to be used to identify a packet for which the potential for expedited processing is to be determined. For example, the filter may include information that identifies a particular source network address, a particular destination network address, a packet protocol, a particular source port, a particular destination port, a flag associated with a packet header, a particular protocol, a particular pattern of data, or the like.

As further shown, application 1 may be associated with process A, and application N may be associated with process N. As shown by reference number 102, the network stack may register filter $F_1$ associated with application 1. Similarly, as shown by reference number 104, the network stack may register filter $F_N$ associated with application N.

As further shown, the network stack may set an initial count for filters $F_1$ and $F_N$. The count may include a value associated with ensuring fairness of expedited processing associated with packets that match the filter and/or are associated with the application. As shown by reference number 106, filter $F_1$ may have an initial count of 400 that is to incrementally increase from time $T_0$ (i.e., time of filter creation) onward. In this case, the count of filter $F_1$ incrementally increases by 10 at each scheduling cycle. Thus, the count of filter $F_1$ reaches 500 by time $T_{10}$.

As shown by reference number 108, filter $F_N$ may have an initial count of 100 that is to incrementally increase from time $T_0$ (i.e., time of filter creation) onward. In this case, the count of filter $F_N$ incrementally increases by 20 at each scheduling cycle. Thus, the count of filter $F_N$ reaches 300 by time $T_{10}$. The count may include a value associated with ensuring fairness of expedited processing associated with packets that match the filter and/or are associated with the application. For example, the count may include a numerical value that increases (e.g., by the initial amount upon registration of the filter or incrementally as time passes without receiving a packet that matches the filter) and decreases (e.g., when expedited processing is performed for a packet that matches the filter). In some implementations, the network device may selectively expedite processing of a packet based on the count, as described below.

As shown in FIG. 1B, example implementation 100 may also include a scheduler. As shown by reference number 110, the network stack may receive a first packet, associated with application 1, at time $T_{10}$. As shown by reference number 112, the network stack may determine that the first packet matches filter $F_1$ (i.e., that the packet is of a type that should be afforded expedited processing).

As shown by reference number 114, the network stack may determine that the count, associated with $F_1$, satisfies a threshold of 400 (e.g., 500≥400=YES). Here, the network stack has determined that filter F1 has accrued enough count in order to permit expedited processing of the packet. Accordingly, and as shown by reference number 116, the network stack may expedite processing of the first packet by, for example, causing the scheduler to schedule process A, associated with application 1, for immediate execution. Thereafter, as shown by reference number 118, the network stack may decrease the count for filter $F_1$ by 300, leaving a remaining count of 200.

As shown in FIG. 1C, and as shown by reference number 120, the network stack may receive a second packet, associated with application 1, at time $T_{15}$. As shown by reference number 122, the network stack may determine that the second packet also matches filter $F_1$.

As shown by reference number 124, the network stack may determine that the count, associated with filter $F_1$, does not satisfy a threshold of 400 (e.g., 250≥400=NO). In this case, because a count amount of 10 has been added at each time unit (e.g., at each scheduling cycle) between $T_{10}$ and $T_{15}$, the count for filter $F_1$ has increased by 50, from 200 to 250, since being decreased. Accordingly, and as shown by reference number 126, the network stack may process the second packet normally (e.g., allowing process A to be scheduled according to a scheduling algorithm rather than being scheduled for immediate execution) by, for example, causing the scheduler to schedule process A, associated with application 1, for normal execution.

In this way, the network device may ensure that a packet, associated with an application, may be processed in accordance with a timing requirement, while also ensuring fairness of expedited processing amongst multiple applications.

As indicated above, FIGS. 1A-1C are provided merely as an example. Other examples are possible and may differ from what was described with regard to FIGS. 1A-1C.

Figure 2:
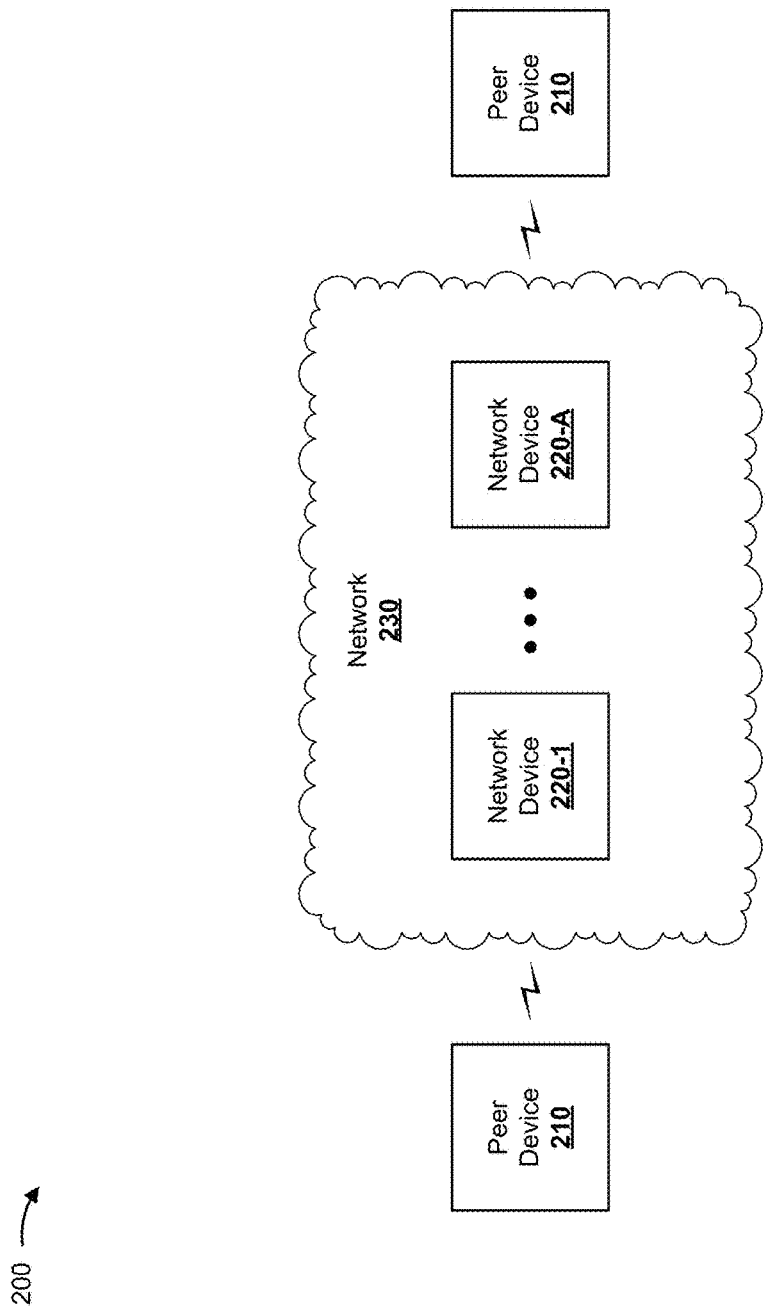
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more peer devices 210, one or more network devices 220-1 through 220-A (A≥1) (hereinafter referred to collectively as "network devices 220," and individually as "network device 220"), and a network 230. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. Additionally, or alternatively, peer device 210 may include an endpoint device that is a source or a destination for network traffic. For example, peer device 210 may include a computer or a similar type of device. Peer device 210 may receive network traffic from and/or may provide network traffic to other peer devices 210 via network 230 (e.g., by routing packets using network device(s) 220 as an intermediary).

Network device 220 includes one or more devices (e.g., one or more traffic transfer devices) capable of processing, forwarding, and/or transferring traffic between peer devices (e.g., peer devices 210) and/or routing devices (e.g., other network devices 220). For example, network device 220 may include a router (e.g., a label switching router (LSR), a label edge router (LER), an ingress router, an egress router, a provider router, etc.), a gateway, a switch, a firewall, a hub, a bridge, a reverse proxy, a server (e.g., a proxy server), a security device, an intrusion detection device, a load balancer, or any traffic transfer device.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
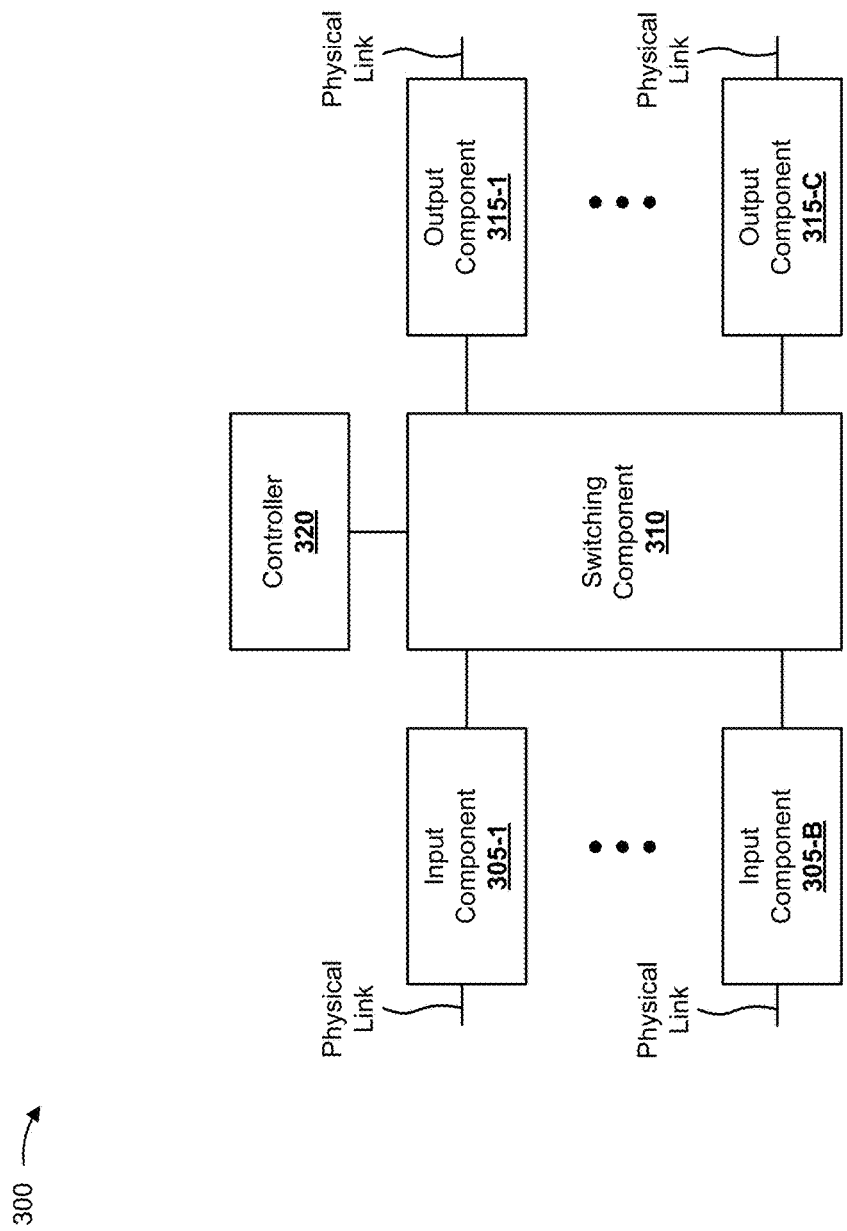
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
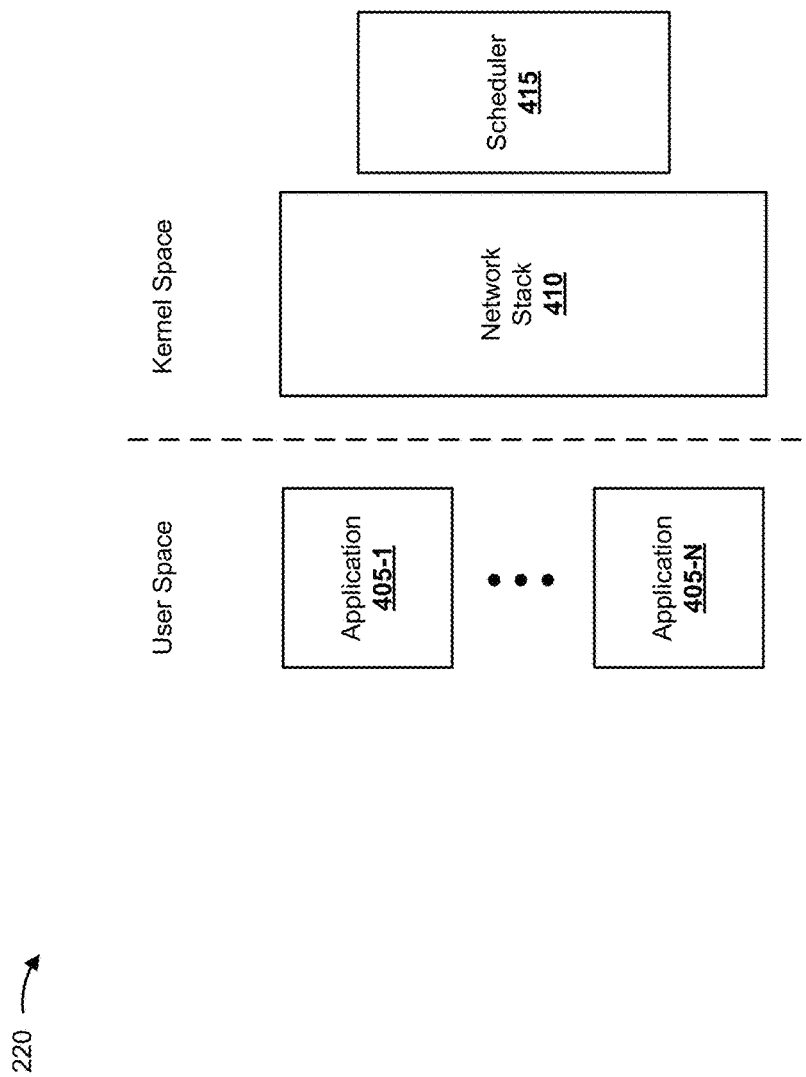
FIG. 4 is a diagram of example functional components of one or more devices of FIG. 2.

FIG. 4 is a diagram of example functional components of network device 220. As shown in FIG. 4, network device 220 may include one or more applications 405-1 through 405-N (N≥1) (hereinafter referred to collectively as applications 405 and individually as application 405), a network stack 410, and a scheduler 415. In some implementations, applications 405, network stack 410, and scheduler 415 are implemented in software that is executed on hardware, such as by a processor, implemented in firmware, or implemented in hardware.

Application 405 may include an application associated with providing one or more services associated with processing network traffic. For example, application 405 may provide a firewall service, a security service, a packet forwarding service, a packet monitoring process, a packet inspection service, a packet processing service, or the like. In some implementations, application 405 may use one or more processes, to be executed using processing resources of network device 220, to provide the one or more services.

Network stack 410 may include a network stack associated with processing packets received by network device 220. In some implementations, network stack 410 may include one or more layers associated with processing packets, such as an Ethernet layer, an Internet protocol (IP) layer, a transmission control protocol and/or user datagram protocol (TCP/UDP) layer, a socket layer, or the like. In some implementations, application 405 may register a filter, associated with application 405, via a socket option of a socket layer of network stack 410 (e.g., where the socket is associated with application 405). In some implementations, network stack 410 may communicate with scheduler 415 in order to coordinate processing of packets received by network device 220.

Scheduler 415 may schedule packets for processing by network device 220. For example, scheduler 415 may queue a process, associated with application 405, for execution such that a packet, associated with the application, may be processed. In some implementations, scheduler 415 may manage a packet buffer associated with application 405. In some implementations, scheduler 415 may schedule a packet for processing such that the packet is processed in an expedited manner, as described herein. Additionally, or alternatively, scheduler 415 may schedule a packet without expedition (e.g., such that the packet is processed normally, using a scheduling algorithm associated with scheduler 415). In some implementations, scheduler 415 may communicate with network stack 410 in order to coordinate processing of packets received by network device 220.

The number and arrangement of functional components shown in FIG. 4 are provided as an example. In practice, network device 220 may include additional functional components, fewer functional components, different functional components, or differently arranged functional components than those shown in FIG. 4. Additionally, or alternatively, a set of functional components (e.g., one or more functional components) of network device 220 may perform one or more functions described as being performed by another set of functional components of network device 220.

Figure 5:
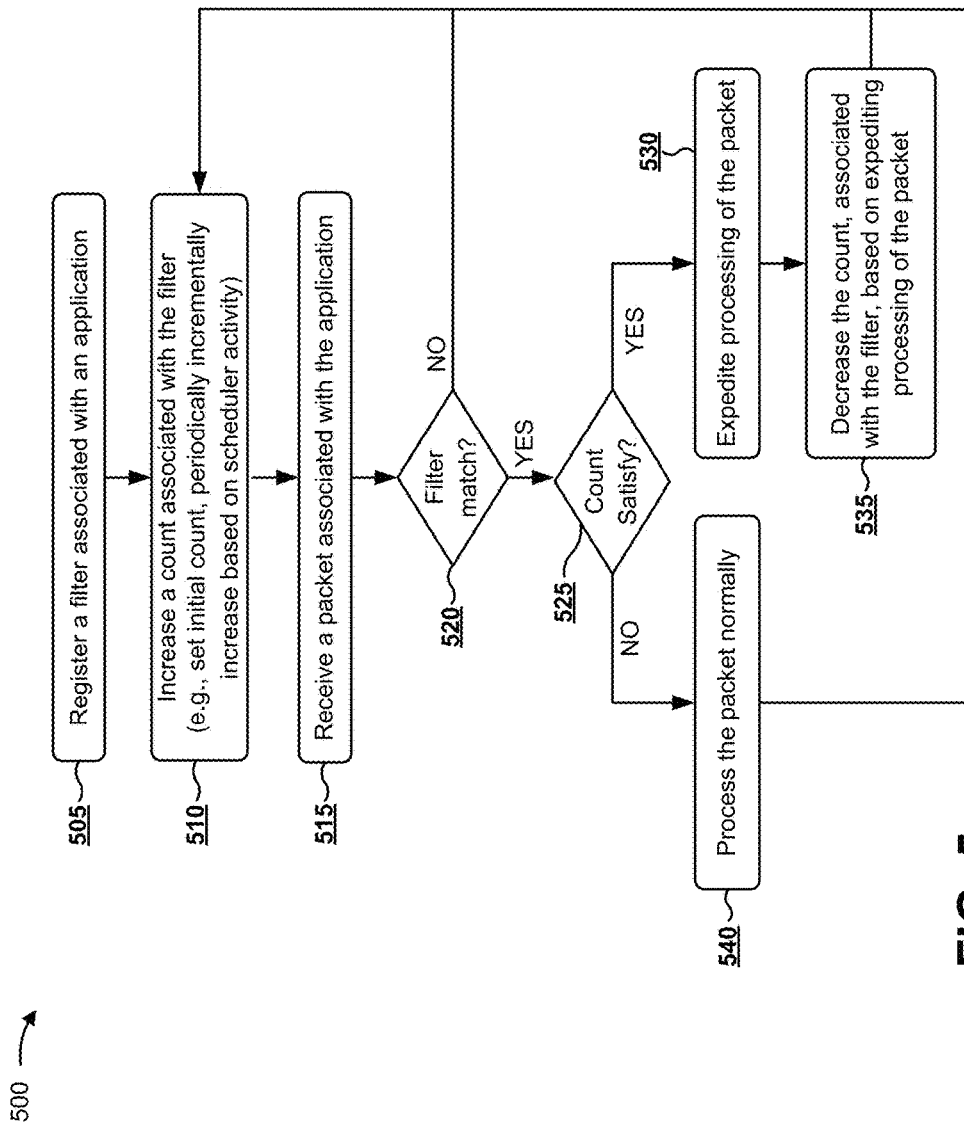
FIG. 5 is a flow chart of an example process for determining whether to expedite processing of a packet, associated with an application, based a count of a filter associated with the application.

FIG. 5 is a flow chart of an example process 500 for determining whether to expedite processing of a packet, associated with an application, based a count of a filter associated with the application.

In some implementations, one or more process blocks of FIG. 5 may be performed by network device 220. In some implementations, one or more process blocks of FIG. 5 may be performed by another device or a group of devices separate from or including network device 220, such as peer device 210.

As shown in FIG. 5, process 500 may include registering a filter associated with an application (block 505). For example, network stack 410 of network device 220 may register the filter associated with the application.

The filter may include information, associated with application 405, to be used to identify a packet for which the potential for expedited processing is to be determined. For example, the filter may include information that identifies a particular source network address (e.g., an Internet protocol (IP) address), a particular destination network address, a particular source port, a particular destination port, a flag (e.g., a reset flag, a push flag, an urgent flag, or the like) associated with a packet header (e.g., a TCP header), a particular pattern of data, a particular protocol associated with the packet, or the like.

In some implementations, when network device 220 receives a packet associated with an application, network device 220 may determine whether the packet matches a filter associated with the application and, if so, may selectively expedite processing of the packet, as described below.

In some implementations, the information associated with the filter may identify a process associated with the filter (e.g., a process associated with the application that is to be executed for processing of the packet). Additionally, or alternatively, the information associated with the filter may identify an initial count amount associated with the filter (e.g., an amount to which the count is to be set upon registration of the filter), an incremental count amount of associated with the filter (e.g., an amount by which the count is periodically increase), a maximum count threshold associated with the filter (e.g., a maximum allowable count associated with the filter), an expediting threshold associated with the filter (e.g., a threshold count amount required to perform expedited packet processing), and/or a decremental count amount of (e.g., an amount by which the count decreases upon performance of expedited packet processing), or the like.

In some implementations, network device 220 may register the filter based on information associated with application 405. For example, application 405 may provide, to network stack 410 (e.g., using a socket option associated with a socket layer of network stack 410), information associated with the filter, and network stack 410 may store the information associated with the filter. In some implementations, application 405 may provide the information associated with the filter based on a configuration of application 405 (e.g., application 405 may automatically register the filter). Additionally, or alternatively, application 405 may provide the information associated with the filter based on user input associated with application 405.

In some implementations, network device 220 may register one or more filters associated with a particular application 405. Additionally, or alternatively, network device 220 may register one or more filters associated with one or more applications.

As further shown in FIG. 5, process 500 may include increasing a count associated with the filter (block 510). For example, network stack 410 may increase the count associated with the filter.

The count may include a value associated with ensuring fairness of expedited processing associated with packets that match the filter and/or are associated with the application. For example, the count may include a numerical value that increases (e.g., upon registration of the filter or as time passes without receiving a packet that matches the filter) and decreases (e.g., when expedited processing is performed for a packet that matches the filter). In some implementations, network device 220 may selectively expedite processing of a packet based on the count, as described below.

In some implementations, network stack 410 may increase the count by setting the count to an initial amount upon registration of the filter. For example, network stack 410 may set the count to a particular value (e.g., 400 units, 500 units, 100 units, or the like) upon registering the filter. In some implementations, information that identifies the initial count amount may be included in the information associated with the filter. Additionally, or alternatively, network stack 410 may be configured with a default initial amount to which the count for a newly registered filter is to be set.

Additionally, or alternatively, network stack 410 may increase the count by an incremental amount. For example, network stack 410 may increase the count, associated with the filter, by 10 units on a periodic basis (e.g., each time a scheduling cycle starts over, at particular intervals of time, or the like).

In some implementations, network stack 410 may increase the count by the incremental amount only when expedited processing of a packet, associated with the application, has not occurred for a period of time (e.g., during a most recent scheduling cycle, during a most recent interval of time, or the like). In some implementations, network stack 410 may increase the count by the incremental amount (e.g., on a periodic basis) while waiting to receive a packet, associated with the application, that matches the filter.

In some implementations, network stack 410 may incrementally increase the count until a maximum count threshold is reached. For example, network stack 410 may incrementally increase the count until the count reaches the maximum count threshold (e.g., 5000 units, 1000 units, or the like). Once the count reaches the maximum count threshold, network stack 410 may not further increase the count until the count is reduced below the maximum count threshold in the manner described below.

In some implementations, information that identifies the incremental count amount may be included in the information associated with the filter. Additionally, or alternatively, network stack 410 may be configured with a default incremental amount by which to increase the count for the application.

In some implementations, the initial amount and/or the incremental amount may be different for one or more filters of one or more applications 405. In this way, network stack 410 may help ensure packets are processed in accordance with timing requirements while allowing for potentially different priorities and circumstances among processes and/or applications.

In some implementations, the initial amount and/or the incremental amount, associated with application 405, may be based on a timing requirement associated with application 405. In some implementations, the initial amount and/or the incremental amount may be determined based on an algorithm that receives, as input, information associated with the timing requirement and provides, as output, information that identifies the initial amount and/or the incremental amount.

As further shown in FIG. 5, process 500 may include receiving a packet associated with the application (block 515). For example, network stack 410 may receive a packet associated with application 405.

In some implementations, network stack 410 may receive the packet (or a notification of the packet), associated with application 405, via a port or a socket associated with application 405. For example, the packet may be provided by peer device 210 and/or another network device 220.

In some implementations, the packet may undergo processing by one or more layers of network stack 410 after being received by network stack 410. For example, the packet may be processed by an Ethernet layer, an IP layer, a TCP/UDP layer, or the like, of network stack 410. Here, when the packet reaches a socket layer of network stack 410 (e.g., after processing by the other layers), network stack 410 may proceed with determining whether the packet matches a filter, as described below.

As further shown in FIG. 5, process 500 may include determining, based on the packet, whether the packet matches a filter associated with the application (block 520). For example, network stack 410 may determine whether the packet matches the filter.

In some implementations, network stack 410 may determine whether the packet matches the filter based on determining whether the packet includes the information associated with the filter. For example, network stack 410 may determine whether a source address included in the packet matches a source address identified by the filter, a destination address include in the packet matches a destination address identified by the filter, a source port included in the packet matches a source port identified by the filter, a destination port included in the packet matches a destination port identified by the filter, a particular flag (e.g., associated with a packet header) included in the packet matches a flag identified by the filter, a particular packet protocol associated with the packet, a particular sequence of data in the packet matches a sequence of data identified by the filter, or the like. In some implementations, network stack 410 may identify one or more filters, associated with the application, and may determine whether the packet matches at least one of the one or more filters.

As further shown in FIG. 5, if the packet does not match the filter (block 520—NO), then process 500 may return to block 510 to increase the count associated with the filter. For example, in some implementations, if the packet does not match the filter, then network stack 410 may continue waiting to receive a packet that matches the filter, as described above. Here, network stack 410 may continue to incrementally increase the count associated with the filter.

As further shown in FIG. 5, if the packet matches the filter (block 520—YES), then process 500 may include determining whether a count, associated with the filter, satisfies a threshold (block 525). For example, if the packet matches the filter, then network stack 410 may determine whether the count, associated with the filter, satisfies an expediting threshold.

In some implementations, the expediting threshold may include information that identifies a count needed for network device 220 to expedite processing of a packet. For example, the expediting threshold may be a numerical value, such as 500 units, 1000 units, or the like. In some implementations, information that identifies the expediting threshold may be included in the information associated with the filter. Additionally, or alternatively, network stack 410 may be configured with a default expediting threshold associated with the filter.

In some implementations, network stack 410 may determine that the count satisfies the expediting threshold when the count is greater than or greater than or equal to the expediting threshold. Additionally, or alternatively, network stack 410 may determine that the count does not satisfy the expediting threshold when the count is less than or less than or equal to the expediting threshold.

As further shown in FIG. 5, if the count satisfies the threshold (block 525—YES), then process 500 may include expediting processing of the packet (block 530). For example, if the count satisfies the expediting threshold, then network stack 410 may expedite processing of the packet.

Expedited processing of the packet may include causing a process (sometimes referred to as a thread), associated with processing the packet, to be immediately (or substantially immediately) executed by network device 220 such that the packet may be processed in an expedited manner (e.g., without waiting for the process to be scheduled by scheduler 415). In other words, expediting processing of the packet may include causing the process to be queued for immediate execution.

In some implementations, network stack 410 may expedite processing of the packet based on communicating with scheduler 415. For example, network stack 410 may provide, to scheduler 415, an indication that processing of the packet is to be expedited. Here, scheduler 415 may receive the indication and may identify (e.g., based on information included in the packet, information associated with the filter, etc.) the process associated with processing the packet. Here, scheduler 415 may immediately (e.g., without queuing, as soon as processing resources are available, etc.) cause the process, associated with the packet, to be executed, and may place the packet in a socket buffer, associated with application 405, for processing. The packet may be processed by the process, accordingly.

As further shown in FIG. 5, process 500 may include decreasing the count, associated with the filter, based on expediting processing of the packet (block 535). For example, network stack 410 may decrease the count, associated with the filter, based on expediting processing of the packet.

In some implementations, network stack 410 may decrease the count by a decremental amount. For example, network stack 410 may decrease the count, associated with the filter, by the decremental amount (e.g., 300 units, 100 units, 500 units, or the like) (e.g., each time network stack 410 causes the process, associated with the processing the packet, to be immediately executed). In some implementations, information that identifies the decremental count amount may be included in the information associated with the filter. Additionally, or alternatively, network stack 410 may be configured with a default decremental amount by which to decrease the count for the filter. In this way, network stack 410 may interact with scheduler 415 in order to facilitate expedited packet processing.

In some implementations, the decremental amount may be different for one or more filters of one or more applications 405. In this way, network stack 410 may help ensure packets are processed in accordance with timing requirements while allowing for potentially different priorities and circumstances among processes and/or applications.

As further shown in FIG. 5, if the count does not satisfy the threshold (block 525—NO), then process 500 may include processing the packet normally (block 540). For example, if the count does not satisfy the expediting threshold, then network device 220 may process the packet normally (e.g., network stack 410 may not expedite processing of the packet). In some implementations, network stack 410 may cause the process, associated with processing the packet to be scheduled (e.g., by scheduler 415) for execution according to a scheduling algorithm stored or accessible by scheduler 415 (e.g., placed in a queue corresponding to a priority level of the process). Here, the count will not be decremented by network stack 410.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As a specific example of the process described above with reference to FIG. 5, an application SampleApp may include a process (e.g., a process, a thread, or the like) P1, which is associated with port 23. SampleApp may require some packets to be processed immediately (e.g., in order to prevent a time-out). In this case, a TCP header of such packets include a push flag (e.g., a PSH flag). Accordingly, a filter may be registered with the network stack that indicates that a packet, associated with SampleApp in which the PSH flag is set (e.g., "tcp.psh=1"), is to be afforded expedited processing.

Here, the filter may be registered with the network stack via a socket option. In this example, assume that the filter has an initial count of 500, an expediting threshold of 400, and that the count of the filter increases by 10 after each scheduling cycle.

At this point, if a packet, associated with the application, arrives with a PSH flag set, the packet will go through normal TCP processing, and the filter corresponding to the socket will be applied. Here, because the count exceeds the expediting threshold, the packet will be immediately queued into the socket buffer and process P1 of SampleApp will be immediately executed (e.g., context switched in).

In such a case, the count for the filter will then be reduced (e.g., by 400). The new count thus becomes 100. Since for each cycle, the count increases by 10, it will take the next 40 iterations of the cycle for process P1 to be eligible again for expedited processing. If process P1 does not use the count associated with the filter, the count will continue to accumulate until the count reaches a maximum threshold (e.g., 5000). Thereafter, the count will not continue to accrue unless process P1 again uses an amount of the count associated with the filter, thus reducing the count below the maximum threshold.

Implementations described herein may provide a network device capable of ensuring expedited processing of a packet such that the packet is processed in accordance with a timing requirement. In some implementations, the network device may utilize a filter, associated with the application, to determine that processing of the packet should be expedited. Here, upon receiving a packet that matches the filter, the network device may execute a process, associated with processing the packet, in order to ensure that the packet is processed in accordance with the timing requirement.

In some implementations, the network device may distribute, manage, and monitor a count, associated with the filter, in order to ensure fairness of expedited processing (i.e., in order to ensure that the application does not over-utilize expedited packet processing to the detriment of other applications), as described below. In this way, the network device may ensure that a packet, associated with an application, is processed in accordance with a timing requirement, while also ensuring fairness of expedited processing amongst multiple applications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a packet associated with an application;
   identify a filter associated with the application;
   determine that information associated with the packet matches information associated with the filter;
   compare a count, associated with the filter, and an expediting threshold, associated with expediting processing of the packet, based on determining that the information associated with the packet matches the information associated with the filter;
   determine that the count does not satisfy the expediting threshold based on comparing the count and the expediting threshold; and
   selectively expedite processing of the packet based on comparing the count and the expediting threshold, the one or more processors, when selectively expediting the processing of the packet, are to:
   cause a process, associated with processing the packet, to be scheduled for execution according to a scheduling algorithm based on determining that the count does not satisfy the expediting threshold.

2. The device of claim 1, where the one or more processors are further to:
   register the filter associated with the application; and
   where the one or more processors, when identifying the filter associated with the application, are to:
   identify the filter based on registering the filter.

3. The device of claim 2, where the one or more processors are further to:
   increase the count, associated with the filter, by a particular amount based on registering the filter.

4. The device of claim 1, where the one or more processors are further to:
   determine that the count satisfies the expediting threshold based on comparing the count and the expediting threshold; and
   where the one or more processors, when selectively expediting the processing of the packet, are to:
   cause a process, associated with processing the packet, to be queued for immediate execution based on determining that the count satisfies the expediting threshold.

5. The device of claim 4, where the one or more processors are further to:
   decrease the count, associated with the filter, by a particular amount based on causing the process to be queued for immediate execution.

6. The device of claim 1, where the information associated with the packet identifies at least one of:
   a source address of the packet,
   a destination address of the packet,
   a source port of the packet,
   a destination port of the packet,
   a protocol of the packet,
   a flag associated with a packet header of the packet, or
   a particular sequence of bytes included in the packet.

7. A non-transitory computer-readable medium storing instructions, the instructions comprising:
   one or more instructions that, when executed by one or more processors, cause the one or more processors to:
   register a filter associated with an application;
   set a count, associated with the filter, to an initial value based on registering the filter;
   receive a packet associated with the application;
   identify the filter after registering the filter;
   determine whether information associated with the packet matches information associated with the filter,
   the count being associated with the filter and being associated with expediting processing of packets associated with the application; and
   selectively expedite processing of the packet based on determining whether the information associated with the packet matches the information associated with the filter and based on the count associated with the filter.

8. The non-transitory computer-readable medium of claim 7, where the one or more instructions, when executed by the one or more processors, further cause the one or more processors to:
   incrementally increase the count, associated with the filter, on a periodic basis.

9. The non-transitory computer-readable medium of claim 7, where the one or more instructions, that cause the one or more processors to determine whether the information associated with the packet matches the information associated with the filter, cause the one or more processors to:
 determine that the information associated with the packet matches the information associated with the filter; and
 where the one or more instructions, that cause the one or more processors to selectively expedite the processing of the packet, cause the one or more processors to:
  determine, based on determining that the information associated with the packet matches the information associated with the filter, that the count, associated with the filter, satisfies an expediting threshold associated with expediting processing of the packet; and
  cause a process, associated with processing the packet, to be queued for expedited execution based on determining that the count satisfies the expediting threshold.

10. The non-transitory computer-readable medium of claim 9, where the one or more instructions, when executed by the one or more processors, further cause the one or more processors to:
 decrease the count, associated with the filter, by a particular amount based on causing the process to be queued for expedited execution.

11. The non-transitory computer-readable medium of claim 7, where the one or more instructions, that cause the one or more processors to determine whether the information associated with the packet matches the information associated with the filter, cause the one or more processors to:
 determine that the information associated with the packet matches the information associated with the filter; and
 where the one or more instructions, that cause the one or more processors to selectively expedite the processing of the packet, further cause the one or more processors to:
  determine, based on determining that the information associated with the packet matches the information associated with the filter, that the count, associated with the filter, does not satisfy an expediting threshold associated with expediting processing of the packet; and
  cause a process, associated with processing the packet, to be scheduled for execution according to a scheduling algorithm based on determining that the count does not satisfy the expediting threshold.

12. A method, comprising:
 registering, by a device, a filter associated with expediting processing of packets associated with an application;
 increasing, by the device, a count associated with the filter by a particular amount based on registering the filter;
 receiving, by the device, a packet associated with the application;
 determining, by the device and based on receiving the packet, that information associated with the packet matches information associated with the filter;
 determining, by the device and based on determining that the information associated with the packet matches the information associated with the filter, whether the count, associated with the filter, satisfies a threshold; and
 selectively expediting, by the device, processing of the packet based on whether the count satisfies the threshold.

13. The method of claim 12, further comprising:
 increasing the count by an initial amount based on registering the filter, or
 setting the count to an initial value based on registering the filter.

14. The method of claim 12, further comprising:
 increasing the count by an incremental amount on a periodic basis after registering the filter.

15. The method of claim 12, where determining whether the count satisfies the threshold comprises:
 determining that the count satisfies the threshold; and
 where selectively expediting the processing of the packet comprises:
  causing a process, associated with processing the packet, to be queued for immediate execution based on determining that the count satisfies the threshold.

16. The method of claim 15, further comprising:
 decreasing the count by an amount based on causing the process to be queued for immediate execution.

17. The method of claim 12, where determining whether the count satisfies the threshold comprises:
 determining that the count does not satisfy the threshold; and
 where selectively expediting the processing of the packet comprises:
  causing the packet to be processed without expediting the processing of the packet based on determining that the count does not satisfy the threshold.

18. The device of claim 1, where the one or more processors are further to:
 register the filter; and
 set the count, associated with the filter, to an initial value based on registering the filter.

19. The non-transitory computer-readable medium of claim 7, where the one or more instructions, when executed by the one or more processors, further cause the one or more processors to:
 increase the count, associated with the filter, by a particular amount based on registering the filter.

20. The method of claim 12, further comprising:
 determining, based on determining that the information associated with the packet matches the information associated with the filter, that the count does not satisfy the threshold; and
 causing a process, associated with processing the packet, to be scheduled for execution according to a scheduling algorithm based on determining that the count does not satisfy the threshold.

* * * * *